United States Patent
Miyake et al.

(10) Patent No.: US 7,764,613 B2
(45) Date of Patent: Jul. 27, 2010

(54) COMMUNICATION CONTROL METHOD AND SYSTEM

(75) Inventors: Motoharu Miyake, Yokosuka (JP); Hiroshi Inamura, Yokohama (JP); Osamu Takahashi, Kunitachi (JP)

(73) Assignee: NTT DoCoMo, Inc., Tokyo (JP)

( * ) Notice: Subject to any disclaimer, the term of this patent is extended or adjusted under 35 U.S.C. 154(b) by 1284 days.

(21) Appl. No.: 10/915,449

(22) Filed: Aug. 10, 2004

(65) Prior Publication Data

US 2005/0068911 A1 Mar. 31, 2005

(30) Foreign Application Priority Data

Aug. 14, 2003 (JP) .............................. 2003-207600

(51) Int. Cl.
*H04L 12/26* (2006.01)
*H04L 12/56* (2006.01)
(52) U.S. Cl. ...................................... 370/235; 370/401
(58) Field of Classification Search ................. 370/230, 370/231, 235, 236, 252, 229, 236.1, 236.2, 370/351, 389, 394, 401; 709/230, 232, 235, 709/236; 710/106
See application file for complete search history.

(56) References Cited

U.S. PATENT DOCUMENTS

| | | | | |
|---|---|---|---|---|
| 6,160,808 A | * | 12/2000 | Maurya ....................... | 370/389 |
| 6,671,760 B1 | * | 12/2003 | Kawasaki et al. ........... | 710/106 |
| 6,687,227 B1 | * | 2/2004 | Li et al. ....................... | 370/231 |
| 6,760,769 B2 | * | 7/2004 | Jayam et al. ................. | 709/228 |
| 6,975,598 B2 | * | 12/2005 | Honda et al. ................. | 370/278 |
| 7,142,507 B1 | * | 11/2006 | Kurimoto et al. ........... | 370/229 |
| 7,675,898 B2 | * | 3/2010 | Shimonishi et al. ......... | 370/351 |
| 2005/0117515 A1 | * | 6/2005 | Miyake ....................... | 370/231 |

FOREIGN PATENT DOCUMENTS

| | | |
|---|---|---|
| JP | 02-094943 | 4/1990 |
| JP | 2001-298485 A | 10/2001 |

OTHER PUBLICATIONS

Japanese Office Action for Application No. 2003-207600, dated Sep. 2, 2008 (with full translation).

* cited by examiner

*Primary Examiner*—Aung S Moe
*Assistant Examiner*—Feben Haile
(74) *Attorney, Agent, or Firm*—Brinks Hofer Gilson & Lione

(57) ABSTRACT

A transmitter device 20, in transmitting a predetermined number of data blocks out of a plurality of data blocks to a receiver device 10 via a relay device 40, divides and writes into data blocks transmitted in succession, a request code for requesting relay device 40 to relay remaining data blocks. Relay device 40, in the case of accepting the request shown in the request code that is divided and written in the data blocks transmitted from transmitter device 20, notifies the acceptance of the request to transmitter device 20. Transmitter device 20, upon receiving the notification, then transmits the remaining data blocks in succession to relay device 40.

20 Claims, 4 Drawing Sheets

| REQUEST CODE | REMAINING DATA AMOUNT ($x$) |
|---|---|
| 01 | $x < 10$ Kbytes |
| 10 | 10 Kbytes $\leq x < 1$ Mbyte |
| 11 | $x \geq 1$ Mbyte |

COMMUNICATION CONTROL METHOD AND SYSTEM

This application claims priority under 35 U.S.C. §119 to Japanese Patent Application No. 2003-207600 filed Aug. 14, 2003, the entire content of which is hereby incorporated by reference.

BACKGROUND

1. Technical Field

This invention relates to a technique used for realizing efficient data communication.

2. Background Art

TCP (Transmission Control Protocol) is a communication protocol used in Transport Layer under the OSI (Open Systems Interconnection) Reference Model, and serves to ensure reliable data communication. Specifically, when communication is performed according to TCP, data is divided into portions of data with a predetermined data size, each of which data portions is transmitted as a data block (hereinafter referred to as a "segment") after a unique header is added thereto. Each header contains a sequence number for uniquely identifying a data portion contained in a segment to which the header is added, and the sequence number essentially corresponds to an order of segments transmitted from a transmitter device.

According to TCP, a certain number of segments are transmitted in succession into the network at the beginning of a data transfer from a transmitter device according to a number defined by a "congestion window size," where the window size is a number of segments that can be transmitted in succession prior to receipt of an acknowledgment from a receiver device requesting transmission of a subsequent segment. The transmitter device gradually increases, according to a predetermined algorithm called a slow start algorithm, the number of segments transmitted in succession, i.e., the congestion window size, for each acknowledgment received. To prevent possible congestion in the network resulting from transmission of a large number of segments at an initial stage of the communication, the congestion window size is increased gradually.

However, use of the slow start algorithm prevents efficient data communication since, even when a data flow is well below a capacity of a band of a communication line, the algorithm nonetheless increases a congestion window size only gradually. As a result, when using the algorithm, it usually takes some time until an optimum use of the band is realized. A technique for solving this problem is discussed in Laid-Open Japanese Patent Application JP 2001-298485.

The technique disclosed in JP 2001-298485 enables efficient data transmission as in the following. A transmitter device stores a default value and a predetermined threshold of a congestion window size. Upon initiation of data transmission, the transmitter device transmits a number of segments according to the default congestion window size. In a case that the window size remains smaller than the threshold at a time of receiving an acknowledgement for the transmitted segment(s), the transmitter device increases the congestion window size up to the predetermined threshold. Thus, efficient data transmission is enabled.

In communication using the Internet, a transmitter device and a receiver device are not usually connected to the same communication network and rarely communicate directly with each other. Generally, as shown in FIG. 7, a receiver device 210 is connected to a communication network 230A; and a transmitter device 220 is connected to a communication network 230B. The communication network 230A is connected to the communication network 230B via a relay device 240 such as a router, and transmitter device 220 and receiver device 210 communicate with each other via relay device 240. However, when the technique disclosed in JP 2001-298485 is applied to data communication performed via relay device 240, as the case in the system shown in FIG. 7, a possibility exists that a number of segments exceeding a capacity of relay device 240 may be transmitted to the relay device, thereby resulting in congestion.

SUMMARY OF THE INVENTION

The present invention is envisioned for solving the problem stated above, and its object is to provide a technique for avoiding congestion at a relay device, and for realizing efficient data communication.

To solve the stated problem, the present invention provides a communication method comprising: computing a data amount of data blocks to be transferred from a transmitter device to a receiver device via a relay device; transmitting to the relay device inquiry data including at least the computed data amount; and notifying the transmitter device from the relay device, upon receipt of the inquiry data received at the relay device, of permission to transmit data blocks of the computed data amount in a case that the relay device is capable of relaying data blocks of the computed data amount.

In a preferred embodiment, a data amount of data blocks to be transmitted in succession from the transmitter device is stored in a storage means of the transfer device, and the above communication method further comprises increasing the data amount of data blocks to a value corresponding to a computed data amount when permission is received from the relay device.

The present invention further provides a transmitter device comprising: computation means for computing a data amount of data blocks to be transferred to a receiver device via a relay device; first transmission means for transmitting, to the relay device, inquiry data including at least the data amount computed by the computation means; and second transmission means for transmitting the data blocks in succession where the transmitter device receives, in response to the inquiry data, a notification from the relay device permitting transmission of the data blocks of the computed data amount.

In one preferred embodiment, the first transmission means of the transmitter device transmits the inquiry data when transmitting previous data blocks preceding the data blocks waiting for transmission. Preferably, the first transmission means transmits the inquiry data to the relay device after dividing the inquiry data into portions and sequentially writing each of the divided portions of the inquiry data into the previous data blocks.

The present invention still further provides a relay device comprising receiving means for receiving inquiry data of data transmission from a transmitter device which transmits data blocks in succession, the inquiry data including at least a data amount of the data blocks; determination means for determining whether it is possible to relay the data blocks to a receiver device; and transmission means for transmitting to the transmitter device a notification informing a result of the determination performed by the determination means, at least where it is determined by the determination means that it is possible to relay the data blocks.

Additionally, the present invention provides a program product for causing a computer device to execute the processes performed by the transmitter device or by the relay device elaborated above.

According to the present invention, efficient data transmission is enabled while avoiding congestion at a relay device.

DETAILED DESCRIPTION OF PREFERRED EMBODIMENTS

1. Configuration of System

Figures 1, 2:
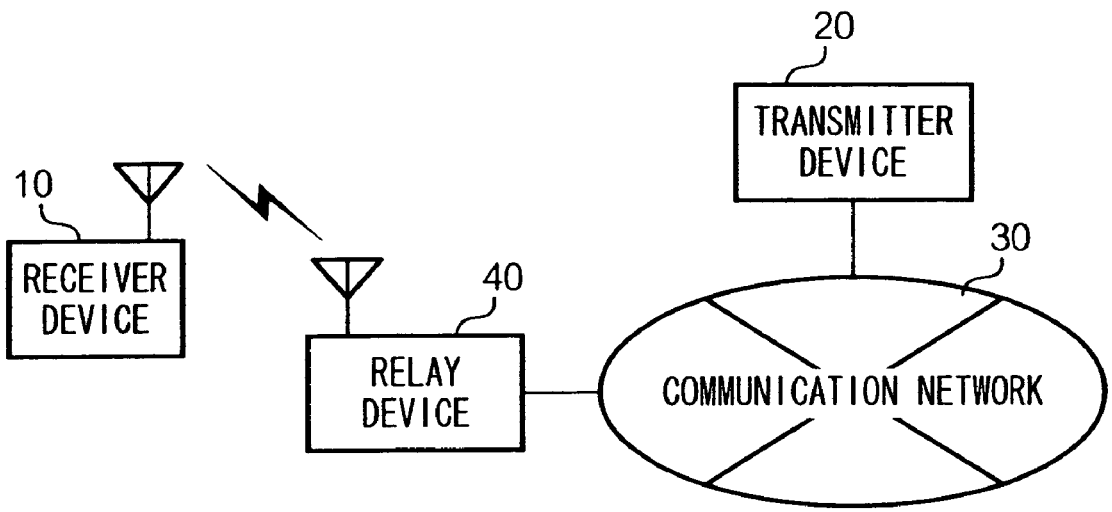
FIG. 1 is a diagram showing an overall configuration of a communication system according to the present invention.
FIG. 2 is a diagram showing an example of a request code table stored in a transmitter device 20 and a relay device 40.

FIG. 1 is a diagram showing an overall configuration of an example communication system according to an embodiment of the present invention. A receiver device 10 is a computer device having a wireless communication function, and capable of performing communication according to TCP with a wireless access point device serving the device 10. A transmitter device 20 is a computer device connected to a communication network 30 such as the Internet, and capable of transferring data according to TCP.

Transmitter device 20 divides data into a plurality of segments before transmission to receiver device 10. Transmission is usually performed according to the slow start algorithm. Specifically, transmitter device 20 gradually increases a number of segments transmitted in succession, i.e., a congestion window size, to two, four, and then to eight segments. In addition, transmitter device 20 divides and writes a request code into each of the segments transmitted in succession. The request code, or inquiry data, is data showing a request made to a relay device 40 to relay, in succession, remaining segments waiting to be transmitted to receiver device 10. In the embodiment, the remaining segments exclude those which transmitter device 20 has already transmitted or is about to transmit. When transmitter device 20 receives a notification from relay device 40 allowing the request shown in the request code, the congestion window size is updated with the data amount of the remaining segments. The remaining segments are then transmitted to receiver device 10 in succession.

More specifically, transmitter device 20 stores a request code table shown in FIG. 2, and identifies a request code to be transmitted to relay device 40 on the basis of the details of the request code table, and a data amount of the remaining segments. Transmitter device 20 then divides the identified request code into portions having a predetermined data size (1 bit in the present embodiment), and writes each divided portion of the request code into a predetermined area of each segment for transmission to receiver device 10. In the present embodiment, an area for CE (Congestion Experience) bit is used as the predetermined area, where the CE bit is used when congestion control is performed according to ECN (Explicit Congestion Notification). The predetermined area need not be the area for the CE bit, but may be another area such as a reserved area. The reserved area is an area which is not limited to a particular use in TCP, and can therefore be freely used in accordance with a use defined by a user. The request code is written in the reserved area or in the CE bit area to avoid misinterpretation of the code by a device that has received a segment but is not capable of properly interpreting the code. When written in the reserved area or in the CE bit area, a device incapable of interpreting the code ignores data described in the reserved area or in the CE bit area. Also, since transmitter device 20 divides the request code into smaller data portions, the request code can be transmitted to relay device 40 even if a data length of the request code is larger than an area size of a predetermined area of one segment.

FIG. 2 is a diagram showing an example of a request code table. The request code table illustrated in FIG. 2 contains three types of request codes, "01", "10", and "11", each of which is correlated with a data amount of remaining segments. Relay device 40 is informed of the data amount of the remaining segments upon receiving a request code. Stored in the request code table shown in the figure are examples of the following situations: the request code "01" is transmitted when a data amount of the remaining segments is smaller than 10 Kbytes (1 Kbyte=1024 bytes); the request code "10" is transmitted when a data amount of the remaining segments is equal to or larger than 10 Kbytes or smaller than 1 Mbyte (1 Mbyte=1024 Kbytes); and the request code "11" is transmitted when a data amount of the remaining segments is equal to or larger than 1 Mbyte.

Relay device 40 is a wireless access point device connected to communication network 30. The relay device functions to provide communication between receiver device 10, located in a wireless area covered by the relay device, and transmitter device 20. Specifically, relay device 40 establishes a wireless communication connection with receiver device 10, and also establishes a communication connection with transmitter device 20. Relay device 40 is provided with a queue area having a predetermined storage capacity. Relay device 40 writes, into the queue area, segments that are transmitted from transmitter device 20 via the above communication connection, and sequentially transmits the segments in the queue area to receiver device 10 via the above wireless communication connection. Relay device 40 receives an acknowledgement transmitted from receiver device 10 via the wireless communication connection, and again transmits the received acknowledgement to transmitter device 20 via the communication connection. Thus, relay device 40 relays data communication between receiver device 10 and transmitter device 20.

Further, relay device 40 obtains inquiry data transmitted from transmitter device 20 (i.e., inquiry data of data transmission from transmitter device 20), where the inquiry data includes a data amount of the remaining segments. Specifically, relay device 40 obtains a request code that is divided and is embedded in segments transmitted from transmitter device 20. Relay device 40 determines whether a request shown in the obtained request code, or inquiry data, is acceptable, and notifies transmitter device 20 of the determination result. Specifically, relay device 40 stores the same request code table shown in FIG. 2 as is stored in transmitter device 20; relay device 40 identifies a data amount of remaining segments based on the details of the request code table and the request code transmitted from transmitter device 20. Specifically, relay device 40 determines whether the remaining segments designated in the request code can be received in succession and relayed to receiver device 10 on the basis of the remaining capacity of the queue area, and transmits the determination result to transmitter device 20.

As in the foregoing description, in the communication system shown in FIG. 1, transmitter device 20 notifies relay device 40 of a data amount of the remaining segments. When relay device 40 notifies that the remaining segments can be relayed in succession, transmitter device 20 transmits the remaining segments in succession. As a result, efficient data communication is achieved, and congestion is avoided at relay device 40.

2. Configuration of Transmitter Device 20

Figure 3:
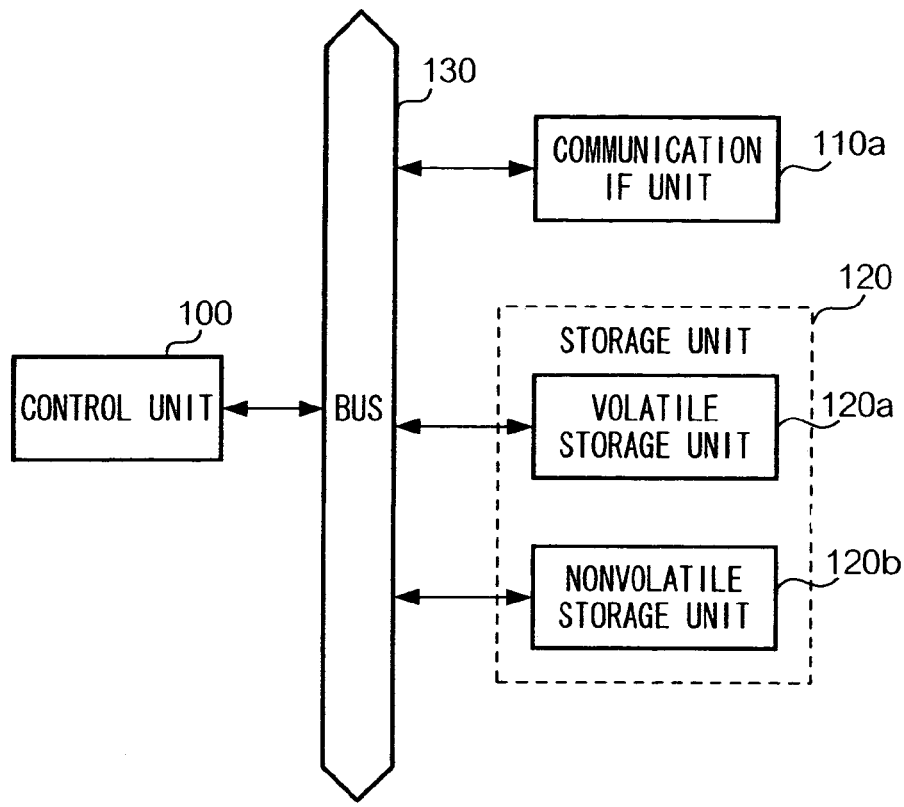
FIG. 3 is a diagram showing an example configuration of transmitter device 20.
Figure 5:
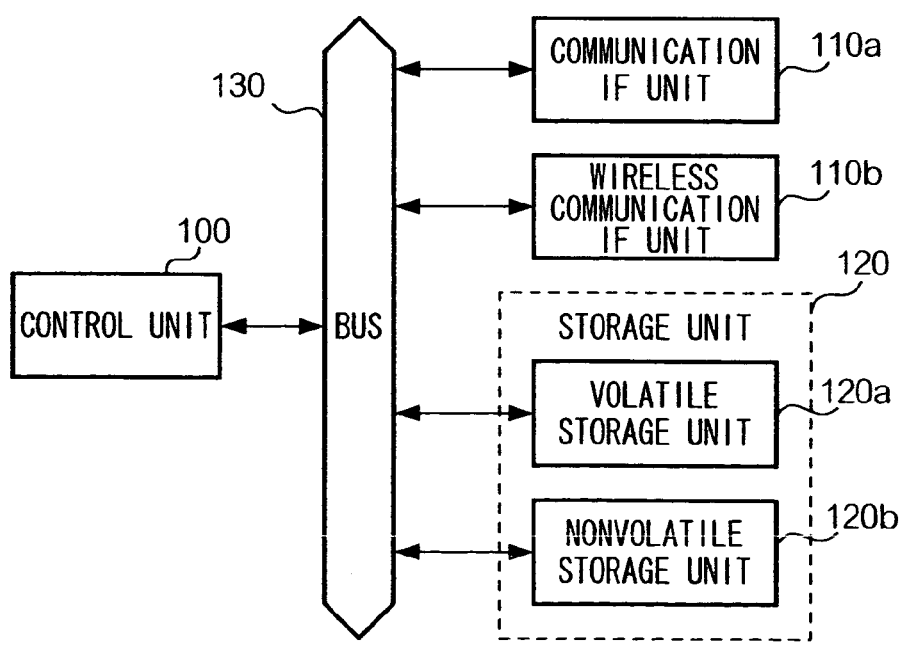
FIG. 5 is a diagram showing an example configuration of relay device 40.

As shown in. FIG. 3, transmitter device 20 has a control unit 100, a communication interface (hereinafter referred to as "IF") unit 110a, a storage unit 120, and a bus 130 used for data exchanges between these components.

Control unit 100 is, for example, a CPU (Central Processing Unit). It executes software stored in storage unit 120, thereby controlling each component of transmitter device 20. Communication IF unit 110a is connected to communication network 30 and receives data transmitted via the network 30. Communication IF unit 110a passes the received data to control unit 100, and transmits to communication network 30 data passed from control unit 100.

As shown in FIG. 3, storage unit 120 comprises a volatile storage unit 120a and a nonvolatile storage unit 120b. The volatile storage unit 120a is, for example, a RAM (Random Access Memory), and used by control unit 100 as a work area for executing software.

Nonvolatile storage unit 120b is, for example, a hard disk, and stores data to be transmitted to receiver device 10 in response to a request from receiver device 10, the request code table (refer to FIG. 2), and other software. For example, in nonvolatile storage unit 120b there is stored operating system (hereinafter referred to as "OS") software, which is run in control unit 100. Nonvolatile storage unit 120b also stores transmission software for causing control unit 100 to execute data transmission operations to transmit data to receiver device 10.

Nonvolatile storage unit 120b also stores in advance data of a congestion window size, i.e., a predetermined number of segments of a certain data size that can be transmitted in succession. A change in window size is initiated each time receipt of a transmitted segment is acknowledged by receiver device 10. In the present embodiment, the window size is updated with a value corresponding to a data amount of remaining segments when permission is given from relay device 40 for the transmission of the remaining segments.

In the following, description will be given of functionalities realized by control unit 100 by executing the aforementioned software.

When transmitter device 20 is turned on, control unit 100 first reads the OS software from nonvolatile storage unit 120b. Control unit 100 then executes the OS software, thereby realizing functional control of each component of transmitter device 20, and of reading and executing other software from nonvolatile storage unit 120b. Control unit 100, when receiving a request from receiver device 10 for transmission of data, reads and executes the transmission software from nonvolatile storage unit 120b.

Figure 4:
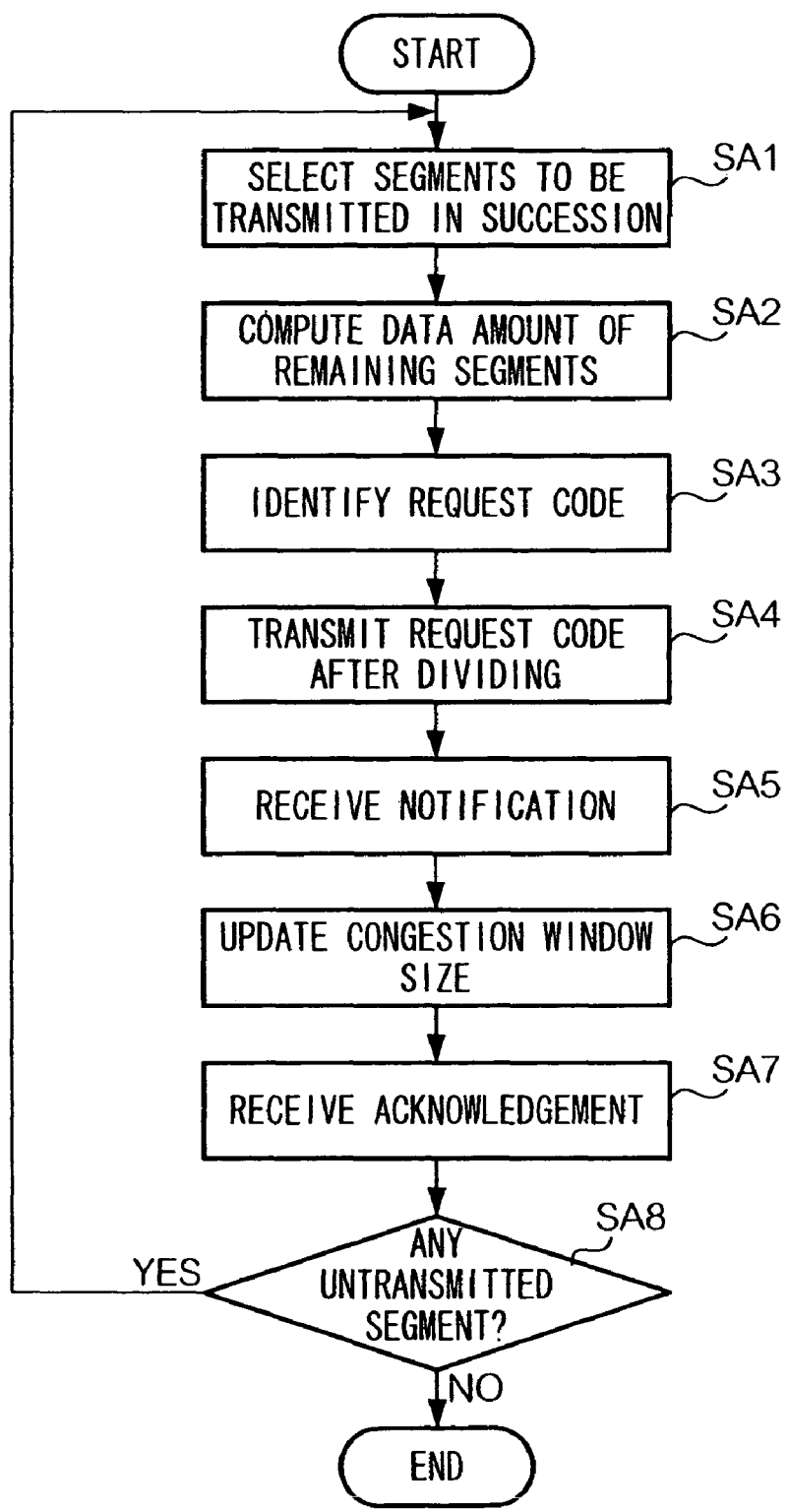
FIG. 4 is a flowchart showing a segment transmission operation executed by a control unit 100 of transmitter device 20.

FIG. 4 is a flowchart showing a flow of a segment transmission operation executed by control unit 100 and realized by the transmission software. As shown in FIG. 4, in this case control unit 100 provides five different functionalities: a selection functionality; a computation functionality; an identification functionality; a first transmission functionality; and a second transmission functionality.

By the selection functionality, data is divided into a plurality of segments, and from among the plurality of segments, segments to be transmitted in succession are selected according to an initial window size of the slow start algorithm. Control unit 100 increases a congestion window size to 2, 4, and then to 8 segments according to the algorithm, and selects a number of segments corresponding to the updated congestion window size in an ascending order, starting from a segment having an oldest sequence number.

By the computation functionality a data amount of the remaining data segments from among the plurality of segments is computed. Given that each of the plurality of segments has an identical data length, the data amount of the remaining segments can be computed by multiplying the data length by a number of the remaining segments.

The identification functionality identifies a request code to be transmitted to relay device 40 on the basis of the data amount computed by the computation functionality and the details of the request code table.

By the first transmission functionality segments selected by the selection functionality are transmitted after the request code identified by the identification functionality is divided and written into a predetermined area of each segment. The segments are transmitted via communication IF unit 110a to relay device 40. More specifically, control unit 100 divides the request code by a unit of 1 bit, and a segment having a smaller sequence number has a divided portion of the request code that is closer to the leading portion of the request code embedded therein.

By the second transmission functionality the remaining segments are transmitted when transmitter device 20 receives a notification from relay device 40 that successive transmission of the segments of the amount designated in the request code is permitted.

As in the foregoing, a hardware configuration of transmitter device 20 is the same as that of a general computer, but functionalities peculiar to the transmitter device of the present invention are provided by causing control unit 100 to execute various software stored in the storage unit.

3: Configuration of Relay Device 40

The configuration of relay device 40 is the same as that of transmitter device 20 except for the following three points. First, relay device 40 has a wireless communication IF unit 110b for wirelessly communicating with receiver device 10. Second, a volatile storage unit 120a is used as a queue area. Third, relay software, instead of transmission software, is stored in nonvolatile storage unit 120b. The relay software causes control unit 100 to realize functionalities particular to the relay device of the present invention. In the following, description will be given of functionalities provided to control unit 100 of relay device 40 upon execution of software stored in nonvolatile storage unit 120b.

When relay device 40 is turned on, control unit 100 first reads and executes OS software from nonvolatile storage unit 120b. Control unit 100 operating under the OS software functions to control each component of relay device 40, and to read and execute other software from nonvolatile storage unit 120b. When execution of the OS software is completed, control unit 100 immediately reads and executes the relay software from nonvolatile storage unit 120b.

Figure 6:
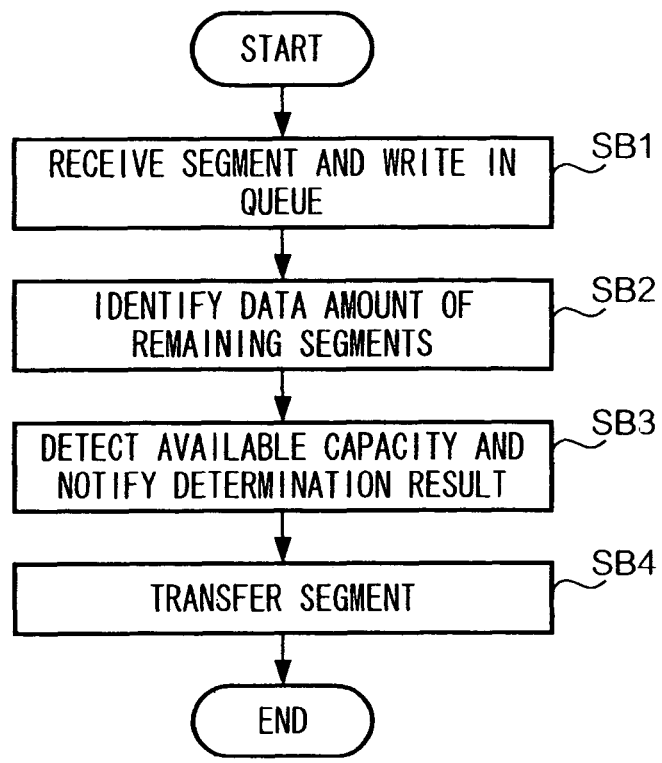
FIG. 6 is a flowchart showing a segment relaying operation executed by a control unit 100 of relay device 40.
Figure 7:
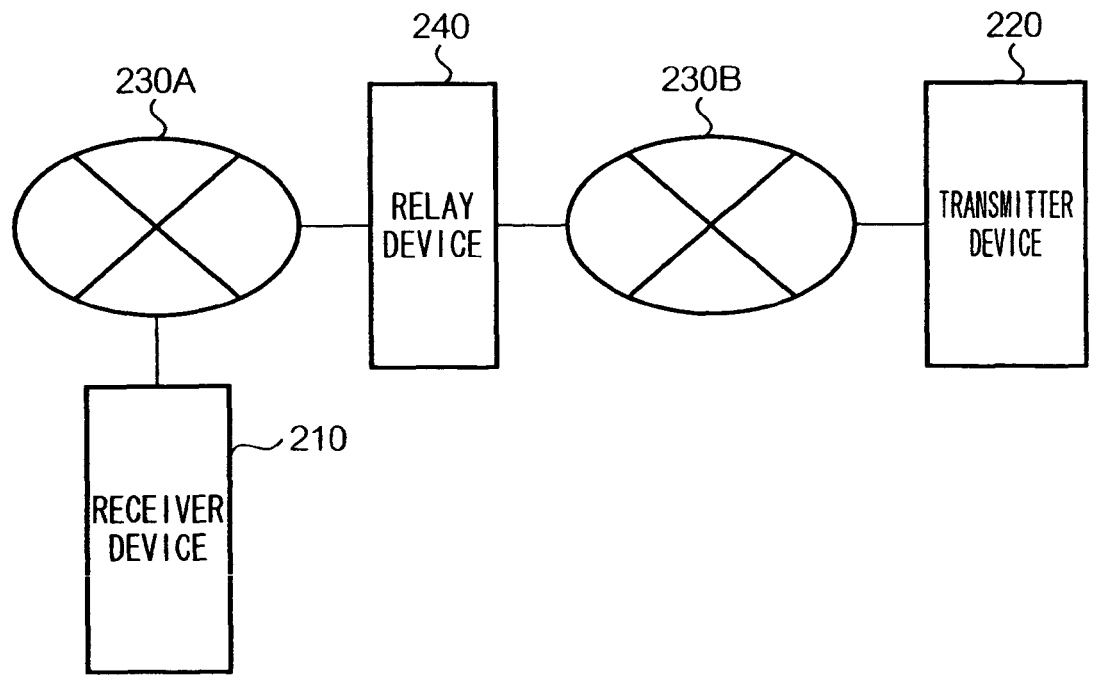
FIG. 7 is a diagram showing a general communication system.

FIG. 6 is a flow chart showing a segment relaying operation executed by control unit 100 according to the relay software. As shown in FIG. 6, control unit 100 is provided with a general relaying functionality of relaying a segment transmitted from transmitter device 20 to receiver device 10 using the queue area, and of relaying an acknowledgement transmitted from receiver device 10 to transmitter device 20. Control unit 100 is further provided with the following two functionalities particular to the relay device according to the present invention.

By a first functionality a request code in obtained that is divided and written in segments and received from transmitter device 20, and a data amount shown in the obtained request code is identified based on the request code and details of the request code table. Specifically, control unit 100 obtains a request code by obtaining data written in a predetermined area for each of received segments, and concatenates a plurality of obtained data in an order of sequence numbers contained in the segments. A data amount designated by the request code is identified on the basis of the request code and the details of the request code table.

By a second functionality an available capacity of the queue area is detected, and, on the basis of the detected capacity and the data amount identified by the first functionality, it is determined whether to relay segments of the number or amount shown in the request code, and the determination result is notified to transmitter device 20.

As in the foregoing, a hardware configuration of relay device 40 is the same as that of a general computer, but functionalities particular to the relay device of the present invention are rendered by causing control unit 100 to execute various software stored in the storage unit.

Operations:

Description will now be given, with reference to the drawings, of an operation performed by transmitter device 20 and relay device 40, respectively; and in particular, of an operation relating to the characteristics of the transmitter device and the relay device of the present invention. In this example, transmitter device 20, when receiving a request for transmitting data stored in nonvolatile storage unit 120b, divides the data into 15 segments for transmission, each having a data length of 500 bytes. Also, a sequence number in increments of 500 is written in each of the 15 segments, depending on a relative location of data contained in each segment. Further in this example, the storage capacity of the queue area provided with relay device 40 is 2 Mbytes, and 100% of the capacity is free at the start of the communication.

First, description will be given, with reference to FIG. 4, of an operation performed by control unit 100 of transmitter device 20 when data transmission is requested from receiver device 10. As shown in the figure, control unit 100 first selects segments to be transmitted in succession from among 15 segments to be transmitted to receiver device 10 (Step SA1). Specifically, control unit 100 selects, in an ascending order starting from a segment with the smallest sequence number, segments of the number designated by the congestion window size. At the start of the operation, the congestion window size is set as 2. Given that each segment has embedded therein a sequence number in increments of 500, control unit 100 selects a segment having a sequence number of 500, and a segment having a sequence number of 1000 in Step SA1.

Control unit 100 then computes a data amount of segments (i.e., remaining segments) excluding transmitted segments and the segments selected in Step SA1, from among 15 segments to be transmitted to receiver device 10 (Step SA2). In the example, not all of the 15 segments have been transmitted yet, and two segments are selected in Step SA1. Therefore, control unit 100 computes the data amount of the remaining segments as 6500 bytes (13×500 bytes).

Subsequently, control unit 100 identifies a request code to be transmitted to relay device 40 on the basis of the data amount computed in Step SA2 and the details of the request code table (refer to FIG. 2) (step SA3). In this example, the data amount computed in Step SA2 is 6500 bytes and the request code table in FIG. 2 shows that the request code "01" is transmitted when the data amount of the remaining segments is less than 10 Kbytes. Therefore, control unit 100 identifies "01" as a request code to be transmitted to relay device 40.

Control unit 100 then divides and writes the request code identified in Step SA3 into the two segments selected in Step SA1, for transmission via communication IF unit 110a (Step SA4). Specifically, control unit 100 writes "0" in a predetermined area of the segment having a sequence number of 500, and "1" in a predetermined area of the segment having a sequence number of 1000, before transmission. Then, control unit 100 waits for an acknowledgement of the segments transmitted in Step SA4, and at the same time, waits for a notification from relay device 40 responding to the request in the request code that was divided and written in the transmitted segments.

In the meantime, the two segments transmitted from transmitter device 20 reach relay device 40 via communication network 30.

As shown in FIG. 6, control unit 100 of relay device 40, upon receipt of the segments transmitted from transmitter device 20 via communication IF unit 110a, writes the received segments in the queue area provided in volatile storage unit 120a (Step SB1).

Subsequently, control unit 100 obtains the request code that is divided and written in the segments received in Step SB1. Control unit 100 then identifies, on the basis of the obtained request code and the request code table (refer to FIG. 2) a data amount of the remaining segments (Step SB2). In this example, the request code written in the received segments in Step SB1 is "01", and therefore, control unit 100 identifies that a data amount of the remaining segments is less than 10 Kbytes.

Control unit 100 then checks for an available capacity of the queue area and determines whether segments of the data amount identified in Step SB2 can be stored in the queue area. Control unit 100 then transmits the determined result to transmitter device 20 via communication IF unit 110a (Step SB3). In this example, the storage capacity of the queue area is 2 Mbytes, and the storage capacity is 100% free at the start of the operation. Thus, control unit 100 determines that the remaining segments can be stored, and notifies transmitter device 20 of the determination result.

Control unit 100 then transmits the segments written in the queue area in Step SB1 via wireless communication IF unit 110b to receiver device 10 (Step SB4). After this step, the operation performed by relay device 40 is the same as that performed by a conventional relay device in relaying segments according to TCP. Specifically, control unit 100 receives an acknowledgement transmitted from receiver device 10 via wireless communication IF unit 110b and transmits the received acknowledgement via communication IF unit 110a to transmitter device 20. It will be obvious to those who skilled in the art that control unit 100 may be caused to execute Step SB4 first, and then Step SB3.

In the meantime, the notification transmitted from relay device 40 reaches transmitter device 20 via communication network 30.

In FIG. 4, control unit 100 of transmitter device 20, upon receiving the notification (step SA5), updates the congestion window size, data of which is stored in nonvolatile memory 120b, on the basis of the details of the notification (Step SA6). Specifically, when the notification received in Step SA5 accepts the request in the request code transmitted in Step SA4, control unit 100 updates the congestion window size with the data amount computed in Step SA2. On the other hand, when the notification received in Step SA5 does not accept the request in the request code transmitted in Step SA4, control unit 100 maintains the present congestion window size. In this example, the notification transmitted from relay device 40 accepts successive transmission of the remaining segments, and therefore, control unit 100 updates the congestion window size with the data amount computed in Step SA2, i.e., 6500 bytes.

From then on, control unit 100, when it receives an acknowledgement for the segments transmitted in Step SA4 (Step SA7), determines whether any segments remain from among the segments to be transmitted to receiver device 10 (Step SA8). The process starting from Step SA1 is repeated until the result of the determination in Step SA8 becomes NO. In this example, it is determined YES in Step SA8 given that there are 13 segments remaining. The routine then returns to Step SA1, where segments transmitted for succession is selected according to the current congestion window size, i.e., 6500 bytes. As a result, all of the remaining 13 segments are transmitted in succession from transmitter device 20 to receiver device 10, and thus transmission of the segments to be transmitted is completed.

As described in the foregoing, in a communication system according to the present invention, from among the 15 segments to be transmitted from transmitter device 20 to receiver device 10, two segments are first transmitted in succession, and then the remaining 13 segments are transmitted in succession. That is, the transmission of the 15 segments is completed in 2 transmission operations. In a conventional system where 15 segments are transmitted according to the slow start algorithm, 2, 4, 8, and then 1 segment is transmitted, which is the total of 4 transmission operations. Thus, the communication system according to the present embodiment enables more efficient transmission of segments as compared to the conventional method of transmitting segments according to the slow start algorithm.

C. Modifications

In the foregoing, an embodiment of the present invention has been described, but the present invention is not limited to such an embodiment and may be modified as, for example, in the following.

Modification 1:

In the above main embodiment, relay device 40 is a wireless access point device connected to communication network 30 and relays communication between a receiver device 10 located in a wireless area covered by the relay device and a transmitter device 20 connected to communication network 30. However, the relay device according to the present invention is not limited to such a wireless access point device, and may be any relay device that relays communication between a transmitter device and a receiver device, regardless of whether a connection between the relay device and the transmitter or receiver device is wired or wireless. For example, a relay device may be wirelessly connected to both a transmitter and a receiver device, where such a relay device receives segments wirelessly transmitted from the transmitter device and wirelessly transmits the received segments to the receiver device. Also, a relay device may be wired to a first communication network and a second communication network.

Modification 2:

In the above main embodiment, a request code is divided by 1 bit unit; and a segment having a lower sequence number has a divided portion of the request code written that is closer to the leading portion of the request code written in a predetermined area, i.e., the CE bit storage area. This configuration enables relay device 40 to restore a request code transmitted from transmitter device 20 by concatenating data obtained from the CE bit storage area of each segment for a plurality of segments, according to an order of the sequence number contained in the segments. However, in a case where a data amount represented by the request code can be identified by relay device 40 without restoring the request code that has been divided before transmission, each divided request code may be written in a predetermined area of each segment independently of an order of a sequence number contained in each segment. For example, a data amount of the remaining segments may be shown by the number of bits that is set to "1" from among bits constituting a request code. In this example, the data amount of the remaining segments is less than 10 Kbytes where the request code comprises 3 bits and the number of bits set to "1" is one; where the number of bits set to "1" is two, the data amount of the remaining segments is equal to or larger than 10 Kbytes and less than 1 Mbyte; and where the number of bits set to "1" is three, the data amount of the remaining segments is equal to or larger than 1 Mbyte. In this way, a data amount of the remaining segments can be found by a relay device by counting the number of bits set to "1", even when a request code is divided and written in a predetermined area of each segment independently of an order of a sequence number contained in each segment.

Modification 3:

In the above main embodiment, a transmitter device, a relay device, and a receiver device perform communication according to TCP. However, a different communication protocol but TCP may be used for performing the communication between the transmitter device and the relay device according to the present invention.

Also, in the above embodiment, relay device 40 notifies transmitter device 20 of a result of the determination as to whether the request from transmitter device 20 is accepted by the relay device, independently of the data exchanges between transmitter device 20 and receiver device 10. However, the notification of the result may be transmitted together with the data exchanges. Specifically, relay device 40 may write data representing the result of the determination into an acknowledgement transmitted from receiver device 10 in response to a segment transmitted from transmitter device 20. Alternatively, where receiver device 10 is provided with a functionality of returning an acknowledgement while retaining data written in a predetermined area of a received segment, relay device 40 may write the data representing the determination result into the predetermined area of a segment transmitted from transmitter device 20, and then relay to receiver device 10 the segment with the determination result having been written therein.

Modification 4:

In the above main embodiment, a relay device determines on the basis of the available capacity remaining in the queue area whether to permit transmission of segments of a data amount shown in a request code notified from the transmitter device. However, data used for the determination is not limited to the available capacity of the queue area. For example, in a communication system shown in FIG. 1, different data may be used which shows a quality of the wireless communication performed via a wireless communication connection established between relay device 40 and receiver device 10 (e.g., data error rate and field strength). Also, data showing the communication band of the wireless communication connection may be alternatively used. The communication quality or the communication band of the wireless communication usually changes from time to time, whereas those of a wired communication do not. Thus, efficient data communication is realized when the present invention is applied to a relay device performing wireless communication.

Modification 5:

In the above main embodiment, a request code showing a data amount of the remaining segments is transmitted from a transmitter device to a relay device, so that the relay device can determine whether segments of the data amount shown in the request code can be received. However, a request code showing a type of data contained in the segment in addition to a data amount may be transmitted from a transmitter device, so that a relay device can determine on the basis of both the type and amount of data whether the remaining segments can be transmitted in succession. In this way, on the basis of the data type information, it is possible to permit transmission of the remaining data when the data is such as requires real time transmission, as is the case with streaming data; and conversely, to not permit transmission when the data is such as does not require real time transmission, as is the case with mail data.

Modification 6:

In the above main embodiment, a request code of fixed length is used, but a request code of variable length such as the Huffman Code may be used. Specifically, the smaller a data amount is of segments remaining for transmission to a receiver device, the shorter a data length of a request code is that may be used. In this way, the smaller the data amount is of the remaining segments, the faster a request code representing the data amount will be notified from the start of the segment transmission. This provides an advantage that transmission of remaining segments is more efficient as compared to that in the above main embodiment.

Also, though the number of segments transmitted in succession varies depending on a quality of a wireless communication path or on other factors such as network infrastructures, the frequency distribution is most likely to follow one having its peak value at a certain number of segments (e.g. a normal distribution). Thus, a request code may be assigned so that the number of segments transmitted more frequently in distribution may be assigned a request code of a shorter data length. In this way, the work load at a transmitter device of writing a request code into data blocks can be reduced; and also, the work load at a relay device is reduced in reading a request code.

Modification 7:

In the above main embodiment, transmitter device 20 determines a request code to be notified to relay device 40 on the basis of a data amount of remaining segments and the request code table shown in FIG. 2. However, the request code table need not necessarily be used by transmitter device 20 to determine a request code for notification. For example, the following process may be executed by control unit 100 of transmitter device 20. Where a data amount of the remaining segments is less than 10 Kbytes, a request code "01" is used; where the data amount is equal to or larger than 10 Kbytes and less than 1 Mbyte, a request code "10" is used; and the data amount is equal to or larger than 1 Mbyte, a request code "11" is used.

Modification 8:

In the above main embodiment, the transmission software is pre-stored in transmitter device 20; and the relay software is pre-stored in relay device 40. However, this software may be written in a computer-readable recording medium such as CD-ROM (Compact Disk-Read Only Memory), and such recording medium may be used to install the above software in a general computer device. In this way, it becomes possible to impart the same functionalities to a general computer device, as those imparted to the transmitter device and the relay device of the present invention.

Modification 9:

In the above main embodiment, relay device 40 transmits to transmitter device 20 a notification informing a result of the determination as to whether it is possible to relay the remaining segments of a data amount designated by a request code. However, it is also possible to transmit a notification only where it is determined that a relay device permits transmission of the remaining segments.

Modification 10:

In the above embodiment, transmitter device 20 computes a data amount of the remaining data and transmits the computed data amount to relay device 40. However, it is also possible to cause another computer device that is connected to communication network 30 or to transmitter device 20 to compute the data amount of the remaining data, and to transmit data showing the computed data amount directly or via transmitter device 20 to relay device 40. Thus, the burden imposed on transmitter device 20 is reduced.

It is therefore intended that the foregoing detailed description be regarded as illustrative rather than limiting, and that it be understood that it is the following claims, including all equivalents, that are intended to define the spirit and scope of this invention.

The invention claimed is:

1. A communication method comprising:
    dividing data into a plurality of data blocks with a transmitter device;
    selecting a first portion of said data blocks to transfer from the transmitter device to a receiver device via a relay device;
    computing, with said transmitter device, a data amount of a second portion of said data blocks that remain to be transferred from said transmitter device to said receiver device via said relay device;
    transmitting from said transmitter device to said receiver device via said relay device said first portion of said data blocks together with inquiry data that includes at least said computed data amount;
    extracting from said first portion of said data blocks said inquiry data with said relay device;
    relaying said first portion of said data blocks to said receiver device with said relay device; and
    notifying said transmitter device by said relay device, in response to said inquiry data extracted at said relay device, of permission to transmit said second portion of said data blocks of said computed data amount in a case that said relay device is capable of relaying said second portion of said data blocks of said computed data amount.

2. A communication method according to claim 1, wherein a window size representative of a size of said first portion of said data blocks transmitted in succession from said transmitter device is stored in a storage unit of said transmitter device, the method further comprising:
    increasing said stored window size to a value corresponding to said computed data amount when said permission is received from said relay device.

3. A transmitter device comprising:
    a control unit included in the transmitter device, the control unit configured to divide data into a plurality of data blocks comprising a first data block and a plurality of second data blocks, said control unit further configured to compute a data amount of said second data blocks to be transferred to a receiver device via a relay device;

said control unit further configured to generate inquiry data indicative of at least said computed data amount, and write said inquiry data into a predetermined area of said first data block;

a communication unit in communication with said control unit, said communication unit operable to transmit said first data block together with said inquiry data to said receiver device via said relay device; and said communication unit further configured to transmit said second data blocks in succession in response to receipt by said communication unit of a notification from said relay device, responsive to said inquiry data, permitting transmission of said second data blocks of said computed data amount.

4. A transmitter device according to claim 3, wherein said communication unit is configured to transmit said inquiry data with said first data block preceding transmission of said second data blocks.

5. A transmitter device according to claim 3, wherein said first data block comprises a plurality of first data blocks, and said communication unit is configured to transmit said inquiry data to said relay device after dividing said inquiry data into portions and writing each of said divided portions of said inquiry data sequentially into said first data blocks.

6. A transmitter device according to claim 3, wherein said inquiry data includes a description of a type of data contained in said second data blocks.

7. A transmitter device according to claim 3, wherein said inquiry data is of a length which is variable depending on said computed data amount of said second data blocks.

8. A transmitter device according to claim 7, wherein said length of said inquiry data is shorter when said data amount of said second data blocks is smaller.

9. A relay device comprising:

a communication unit configured to receive inquiry data of data transmission from a transmitter device which transmits in succession a first portion of a plurality data blocks and then a second portion of said plurality of data blocks, transmission of said first portion of said data blocks including transmission of said inquiry data showing at least a data amount of said second portion of said data blocks awaiting transmission;

a processor in communication with said communication unit, said processor configured to extract said inquiry data included with said first portion of said data blocks and determine whether it is possible to relay said second portion of said data blocks to a receiver device based on said extracted inquiry data; and said communication unit further configured to relay said first portion of said data blocks to said receiver device, and transmit a notification informing a result of said determination performed by said processor, to said transmitter device, at least where it is determined by said processor that it is possible to relay said second portion of said data blocks.

10. A transmitter device comprising:

a computer readable storage unit included in the transmitter device, the computer readable storage unit encoded with a computer program for causing a computer device to execute, the computer readable storage unit comprising:

computer code executable to divide data into a plurality of data blocks;

computer code executable to separate said data blocks into a first portion of said data blocks and a second portion of said data blocks for transmission to a receiver device via a relay device;

computer code executable to determine a data amount of said second portion of said data blocks to be transferred to said receiver device via said relay device;

computer code executable to identify a predetermined control code indicative of said data amount;

computer code executable to segment said control code into segments having a predetermined data size;

computer code executable to write said segments into a predetermined area in at least some of said first portion of said data blocks;

computer code executable to transmit, to said receiver device via said relay device, said first portion of said data blocks and said control code; and computer code executable to transmit said second portion of said data blocks in succession in a case of receipt, in response to said control code, of a notification from said relay device permitting transmission of said second portion of said data blocks.

11. A computer readable storage unit encoded with a computer program for causing a computer device to execute, the computer readable storage unit comprising:

computer code executable to receive an inquiry data of data transmission from a transmitter device, which transmits a first portion of a plurality of data blocks in succession to a receiver device via a relay device, said inquiry data comprising a control code divided among at least some of said first portion of said data blocks and indicative of at least a data amount of a second portion of said data blocks;

computer code executable to extract said inquiry data from said first portion of said data blocks and determine said data amount of said second portion of said data blocks;

computer code executable to determine whether it is possible to relay said second portion of said data blocks to said receiver device based on said determined data amount; and computer code executable to transmit said first portion of said data blocks to said receiver device, and a notification informing a result of said determination to said transmitter device, at least where it is determined that it is possible to relay said second portion of said data blocks.

12. A communication method according to claim 1, further comprising identifying a predetermined control code representative of said computed data amount and including said predetermined control code in said inquiry data transmitted from said transmitter device to said receiver device via said relay device.

13. A communication method according to claim 1, wherein transmitting from said transmitter device to said receiver device via said relay device further comprises dividing said inquiry data into a plurality of parts of a predetermined data size that includes a first part and a second part, and writing said first part into a predetermined area in a first one of said data blocks included in said first portion of said data blocks and writing said second part into a predetermined area in a second one of said data blocks included in said first portion of said data blocks.

14. A communication method according to claim 1, wherein transmitting from said transmitter device to said relay device said first portion of said data blocks comprises formatting said first portion of said data blocks according to a predetermined communication format and adding said inquiry data to said first portion of said data blocks without disturbing said predetermined communication format.

15. A transmitter device according to claim 3, wherein said inquiry data indicative of said computed data amount is in a form of a predetermined control code corresponding to said computed data amount.

16. A transmitter device according to claim 3, wherein said first data block is a plurality of first data blocks, and said control unit is further configured to divide said inquiry data into parts each having a predetermined data size, and write a first one of said parts into a first one of said first data blocks and write a second one of said parts into a second one of said first data blocks.

17. A transmitter device according to claim 3, wherein said first data block is configured for transmission in a predetermined communication protocol, and said control unit is further configured to write said inquiry data into said first data block and maintain compliance of said first data block with said predetermined communication protocol.

18. The relay device according to claim 9, wherein said inquiry data includes said computed data amount in a form of a predetermined control code corresponding to said computed data amount, and said processor is further configured to determine said computed data amount from said predetermined control code.

19. The relay device according to claim 9, wherein said processor is further configured to extract a part of said inquiry data from a predetermined area of each of at least some of said first portion of said data blocks, and assemble said parts to form said inquiry data.

20. The relay device according to claim 9, wherein said first portion of said data blocks, including said transmission of said inquiry data, are transmitted in a predetermined protocol.

* * * * *